US 6,590,167 B2

(12) United States Patent
Clare

(10) Patent No.: US 6,590,167 B2
(45) Date of Patent: Jul. 8, 2003

(54) DIGITAL FILTER FOR FLUID SCALE

(75) Inventor: Christopher R. Clare, Los Altos Hills, CA (US)

(73) Assignee: Ethicon, Inc., Somerville, NJ (US)

( * ) Notice: Subject to any disclaimer, the term of this patent is extended or adjusted under 35 U.S.C. 154(b) by 148 days.

(21) Appl. No.: 09/823,383

(22) Filed: Mar. 30, 2001

(65) Prior Publication Data

US 2002/0170753 A1 Nov. 21, 2002

(51) Int. Cl.[7] .................. G01G 19/34; G01G 23/18; A61M 31/00
(52) U.S. Cl. .............. 177/25.13; 177/185; 177/245; 177/45; 604/500; 604/65; 604/318; 600/584; 128/DIG. 13; 702/101
(58) Field of Search ............ 600/584; 604/317, 604/318, 500, 65, 66, 67; 128/DIG. 13; 177/45–50, 245, 25.13, 185; 702/101

(56) References Cited

U.S. PATENT DOCUMENTS

| 4,606,420 A | * | 8/1986 | Silver .................... 177/160 |
| 4,650,464 A | * | 3/1987 | Ruiz et al. ................ 604/49 |
| 4,712,567 A | * | 12/1987 | Gille et al. ............... 600/584 |
| 4,817,026 A | * | 3/1989 | Inoue et al. .............. 177/185 |
| 4,939,516 A | * | 7/1990 | Early ...................... 341/143 |
| 5,112,319 A | * | 5/1992 | Lai ........................ 604/246 |
| 5,756,940 A | * | 5/1998 | Van Driel et al. ......... 177/245 |
| 6,030,359 A | * | 2/2000 | Nowosielski .............. 604/65 |
| 6,121,555 A | * | 9/2000 | Nowosielski et al. ....... 177/45 |

OTHER PUBLICATIONS

"The Electrical Engineering Handbook", Richard Dorf, Ed.; CRC Press, Inc., copyright 1993, pp. 238–240, 242–244, & 250.*
"Digital Control System Analysis and Design", Phillips et al., Prentice–Hall, Inc., copyright 1984, pp. 355–368 & 379.*
An Article entitled "Digital Filter Designer's Handbook" by C. Britton Rorabaugh, McGraw Hill, Inc., NY 1993, pp. 271 and 272.

* cited by examiner

Primary Examiner—Randy Gibson

(57) ABSTRACT

A device for weighing fluid includes a scale from which a fluid receptacle is suspended. Oscillations in the weight reading due to the pendulous motion of the receptacle are suppressed by a digital filter selected to have rejection notches at the frequencies of weight oscillation.

10 Claims, 8 Drawing Sheets

— SERIES 1

US 6,590,167 B2

DIGITAL FILTER FOR FLUID SCALE

FIELD OF THE INVENTION

The present invention relates to scales for weighing fluids, and more particularly to a filter for stabilizing the readout of scales that dynamically monitor the changing volume of fluid in a fluid receptacle utilized for surgical procedures.

BACKGROUND OF THE INVENTION

Various surgical procedures require the introduction and withdrawal of fluids from the human body, e.g., for the purposes of insufflation to permit endoscopic surgery or for providing a lavage of a surgical site to draw off blood, and/or morcellated tissues for maintaining an acceptable level of visibility and/or sterility at the surgical site. In such procedures, great care must be taken to maintain an acceptable rate of fluid input and output, e.g., to maintain a suitable fluid volume and pressure within the body while, at the same time, maintaining an acceptable level of fluid throughput to accomplish the objectives of its introduction. Present fluid management systems frequently utilize scales from which fluid receptacles are hung to monitor the rate of fluid input and output. More particularly, a fluid receptacle for fluid that is being pumped into the body will register a loss in weight over time at a rate directly proportional to the rate of volume change as the fluid is evacuated from the receptacle and is pumped into the body. Similarly, fluid receptacles that receive fluids withdrawn, leaking or otherwise expelled from the body will gain weight in proportion to the rate of fluid volume acquisition. In this manner, the rate of fluid transfer to and from the body can be measured, monitored and controlled.

Surgical fluids are typically contained in disposable plastic bags, bottles, buckets or other containers that are hung by an attached tab, bracket or other suspender from a hook that depends from a scale. Accordingly, the fluid receptacle hangs from the scale hook and is free to oscillate in a pendulous manner until it comes to rest naturally, i.e., due to friction and other dampening forces. Because the fluid receptacle is free to oscillate, the weight readout on the scale from which the container is hung oscillates correspondingly. That is, when the weight swings through its range of motion, it displays the variations in weight associated with pendulous motion, e.g., lightest at the two extremes of elevation and heaviest at its nadir. Because a hanging fluid receptacle typically has a hanging apparatus that permits the receptacle to oscillate in many planes, the fluid receptacle executes a compound motion having pendulous and rotary components, i.e., the bottom of the receptacle is free to trace a circle while at the same time swinging pendulously. Accordingly, depending upon the forces imparted to the fluid receptacle, the periodic motion and the corresponding oscillation of the measured weight vary. From the standpoint of the surgical team, it is beneficial to have an accurate readout of the fluid receptacle weight (and associated rate of fluid infusion or suction that may be derived therefrom) at all times. It is therefore beneficial to minimize the time for stabilization of the hanging fluid receptacle. More particularly, it has been noted that the fluid receptacle can take several seconds to stabilize when first hung on the scale. Since the fluid receptacle is subject to being moved at any time, e.g., due to someone brushing up against it, moving the scale or tugging on the hoses attached to the receptacle during the surgical procedure, the weight readout and associated flow rate information can be disturbed at any time by these events.

Accordingly, it would be desirable to have a fluid management system that displays a more stable fluid weight readout and one which stabilizes more rapidly after having been disturbed. It is therefore an object of the present invention to provide same.

SUMMARY OF THE INVENTION

The problems and disadvantages associated with the conventional techniques and devices utilized to monitor fluid dispensing and retrieval during surgery are overcome by the present invention which includes a scale system for measuring the weight of an object. The scale system has a support for holding the object and a transducer coupled to the support for converting a force exerted thereon by the object into an electrical signal. A filter receives the electrical signal from the transducer and suppresses noise in the signal at selected frequencies.

BRIEF DESCRIPTION OF THE FIGURES

For a better understanding of the present invention, reference is made to the following detailed description of various exemplary embodiment considered in conjunction with the accompanying drawings, in which.

DESCRIPTION OF THE PREFERRED EMBODIMENTS

Figure 1:
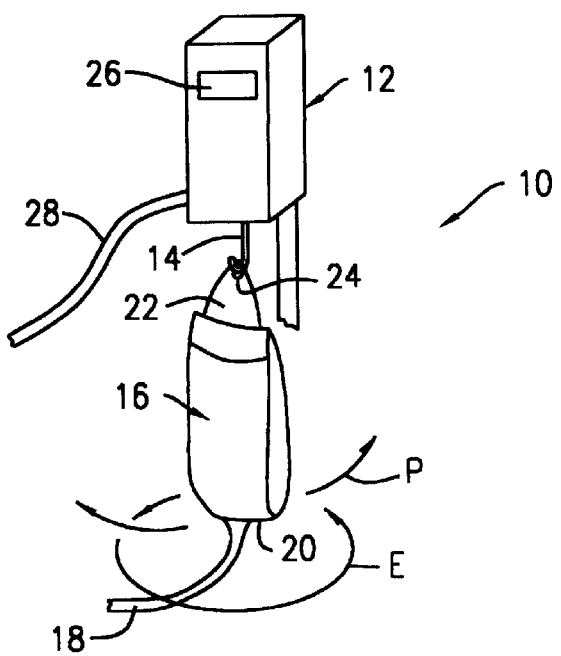
FIG. 1 is a diagrammatic perspective view of a surgical fluid receptacle hanging from a scale.

FIG. 1 shows a surgical fluid monitoring system 10 in accordance with the present invention and having a scale 12 with hanger 14 from which may be suspended a fluid receptacle 16 in the form of a conventional plastic bag or bucket as is known and used in the surgical arts. As shown in FIG. 1, the fluid receptacle 16 is for supplying fluids and has a tube 18 extending from the bottom portion 20 of the fluid receptacle 16. The fluid receptacle 16 has a hanging tab 22 with an upper opening 24 for removably positioning the fluid receptacle 16 on the hanger 14, which, in the embodiment shown, is in the form of a hook. In this manner, the fluid receptacle can be readily removed from the scale 12 when it has become empty for replacement with a full receptacle 16. While the hook-type hanger 14 and hanging tab 22 are common, other forms of removable hanging means for hanging the receptacle 16 from the scale 12 could also be used, such as wire hangers, button/button hole engagement, interlocking snaps, etc. all of which are conventional and known in the art. The scale 12 may be used to indicate the amount of fluid left in the receptacle 16, either measured in weight or translated into volume, via a local display 26. In addition, the weight information may be used to calculate flow rate by comparing readings over time, either within the scale 12, or externally by a microprocessor with which the scale 12 is in communication. The flow rate may be displayed on display 26 and/or shared with a fluid management system 30 (see FIG. 2) via a cable or via wireless radio communication. In this manner, the fluid management system 30 can determine the amount of fluid withdrawn from the receptacle 16 and infused into the body of a patient, for, e.g., insufflation or lavage. While FIG. 1 shows an embodiment of the present invention applied to weighing a receptacle 16 for fluid that is supplied to the body, the present invention is equally applicable to monitor fluid withdrawn or drained from the body and stored in the receptacle 16.

Because the fluid receptacle 16 is designed to be suspended from the scale 12, it is not supported at the bottom 20 and can therefore swing pendulously and elliptically as diagrammatically illustrated by the arrows P and E, producing corresponding oscillations in the force exerted downwardly against the hanger 14. As a result, the measured weight of the receptacle 16 which is displayed and/or utilized to calculate flow rate and/or used as input for controlling pumps and/or suction devices by the fluid management system 30 oscillates and is inaccurate until the periodic motion ceases. The receptacle 16 can be set into periodic motion when the receptacle 16 is first placed on the scale 12 or subsequently, e.g., when the scale 12 is moved or the tube 18 pulled. When the fluid receptacle 16 is first suspended from the scale 12, the settling time and weight accuracy are important in order to determine the "baseline" weight of the receptacle 16. Once such weight has been determined, the fluid management system 30 can compute the change in total volume flow by calculating the difference between the current weight and the baseline weight. The accuracy of the volume is directly influenced by the accuracy of the baseline. The present invention aids in the determination of the baseline by eliminating the interference from motion induced signals.

Figure 2:
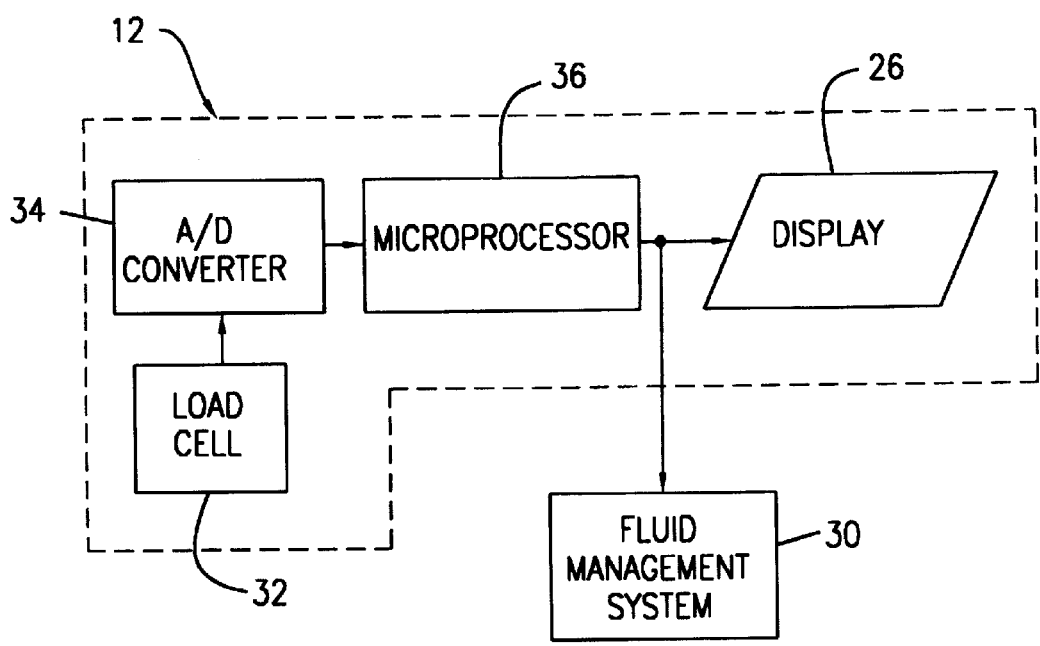
FIG. 2 is a schematic block diagram of the electrical components of a fluid weighing system in accordance with a first embodiment of the present invention.

FIG. 2 shows that the scale 12 contains a load cell 32 or other conventional transducer for generating an electrical signal corresponding to the measured weight of the receptacle 16. An analog to digital converter 34 may be utilized to convert the analog load cell signal into a digital signal which is fed to a microprocessor 36 located either within the scale 12 or externally to it. For example, the microprocessor 36 may be a stand-alone personal computer or a dedicated microprocessor housed within the scale 12. The microprocessor 36 is programmed with instructions to allow it to function as a digital filter 38 as described more fully below. The microprocessor 36 may also be programmed with instructions for calculating volume and/or fluid flow rates based upon changes in measured weight over time. After being processing by the filter 38, the filtered signal is displayed on the display 26 and/or shared with the fluid management system 30, which can then control the various pumps and vacuum devices in the system (not shown) to maintain a desired throughput of fluid into and out of the patient, as applicable. Typically, the flow rate is determined by a fluid pump and the weigh scales are used for volume measurement. The total volume of fluid infused into the body and not recovered is a critical parameter.

The present invention recognizes that the oscillations in weight measured by a hanging scale can be damped by a digital filter which suppresses those oscillations. The first step in selecting the appropriate digital filter is to determine the characteristic frequencies of the weight signal which constitute the "noise" in the signal. This may be done with a sampling oscilloscope that receives the unfiltered oscillating scale output. The fluid receptacle 16 is hung from the scale 12 and subjected to the typical displacements and disturbances as would be encountered in use. For example, the receptacle 16 is hung and allowed to swing naturally until coming to rest. The receptacle 16 can be bumped, pushed and pulled in a variety of directions to simulate the various potential displacements it may experience during actual use. The results of the sampling of the oscillating weight signals for a commercially available bucket-type fluid receptacle 16 in the empty state revealed seventeen (17) swings in twenty-one (21) seconds with a measured weight oscillation of about 0.8 Hz and 1.62 Hz. These signals apparently correspond to the basic frequency of a full swing and to double the swing rate due to the two changes in weight extremes corresponding to the upper and lower extremes of pendulous motion traversed on each swing. When filled with fluid and at ½ and ¼ full, the measured oscillation frequencies drop to 0.74 and 1.48 Hz. A similar test on a half-filled bag-type fluid receptacle 16 revealed oscillation frequencies of 0.8 and 1.62 Hz. Accordingly, based upon observation of typical, commercially-available fluid receptacles 16, their oscillation rate on a hanging scale falls approximately in the range of 1.48 to 1.62 Hz.

The digital filter 38 for suppressing the observed weight oscillation frequency can be designed in accordance with known principles and methods, e.g., as shown in the book Digital Filters Designer's Handbook, C. Britton Rorabaugh, McGraw Hill, Inc., NY, 1993. Using such known digital filter design methods, the following formula may be derived:

$$H(z) = \frac{\frac{1}{32} + \frac{3}{32}z^{-1} + \frac{1}{8}z^{-2} + \frac{1}{8}z^{-3} + \frac{3}{32}z^{-4} + \frac{1}{32}z^{-5}}{1 - \left(\frac{5}{8}z^{-1} - \frac{1}{8}z^{-2}\right)}$$

with H(z) representing the output for a given sampled variable z (the oscillating weight signal in this case), and with $z^{-1}$ indicating the value of the sampled variable preceding the present value, $z^{-2}$ indicating the value of the sampled value preceding $z^{-1}$, etc.

Figure 3:
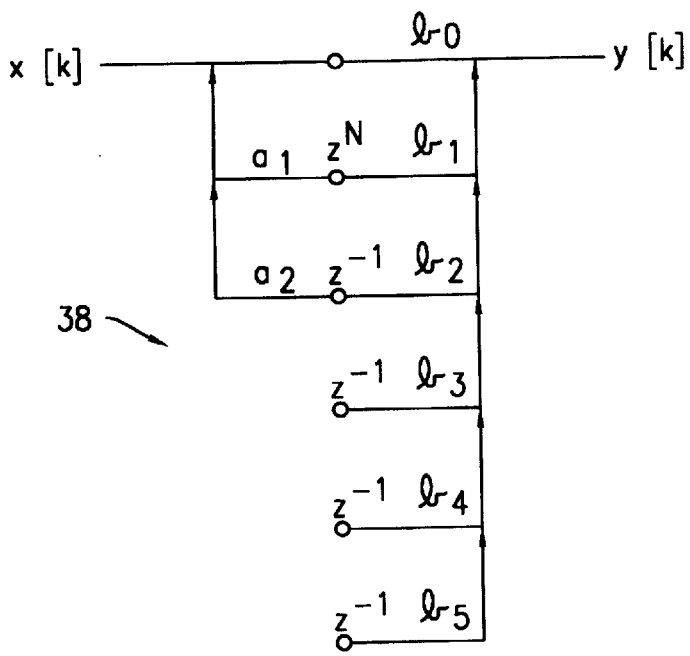
FIG. 3 is a digital filter formula diagram describing a digital filter for programming the microprocessor of FIG. 2.

In accordance with standard practices in the design of digital filters, the filter 38 can be expressed graphically in the form shown in FIG. 3 and can be further characterized as a second order, infinite input response filter. The weighting coefficients for the filter are as follows:

$$a_1 = \frac{5}{8}, a_2 = -\frac{1}{8}, b_0 = b_5 = \frac{1}{32}, b_1 = b_4 = \frac{3}{32}, b_2 = b_3 = \frac{1}{8}$$

It is known that digital filters display rejection notches or ranges of frequencies with steep rejection/suppression and that the location of these notches is related to sampling frequency. In accordance with the present invention, the sampling rate and the filter 38 are selected to realize steep rejection at the observed oscillation frequencies of the fluid scale, e.g., 1.62 Hz.

Figure 4:
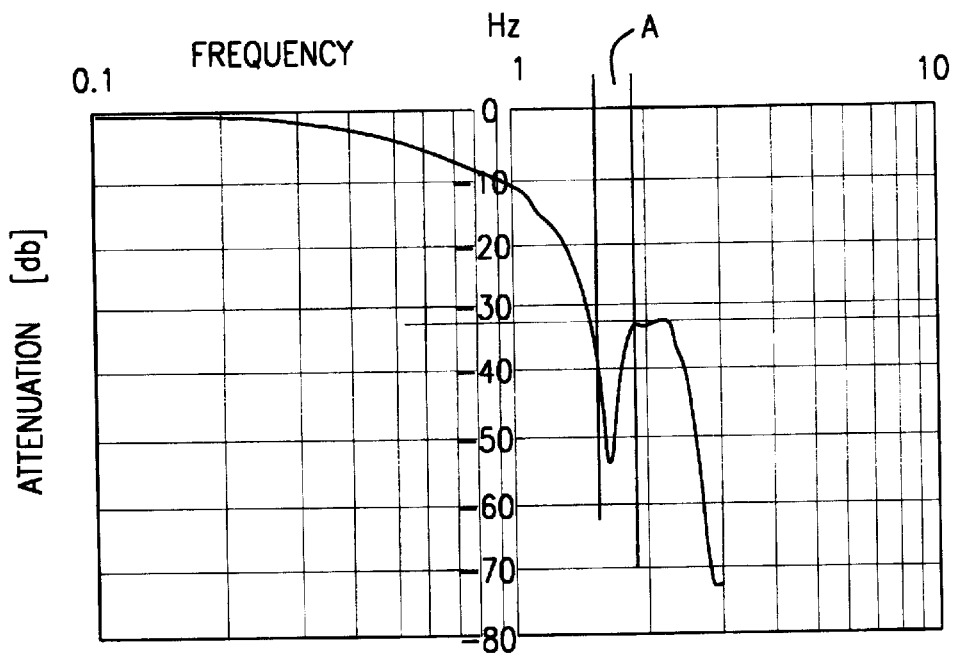
FIG. 4 is a graph of attenuation vs. frequency for a digital filter as described in the diagram of FIG. 3.

FIG. 4 illustrates the Attenuation (in decibels) of the digital filter described in equation form above and illustrated in FIG. 2 when employing a sampling rate of 6.5 samples per sec (sps) at a center frequency (wc) of 1 Hz. As can be appreciated in FIG. 4, the filter exhibits a rejection notch in the range A of one of the weight oscillation rates of interest, viz., about 1.48 to 1.62. It should be appreciated that FIG. 4 is a graph of simulated filter response, viz., that the sampled data was generated and stored by a computer rather than received as output in real time from a scale, such as the scale 12.

Figure 5:
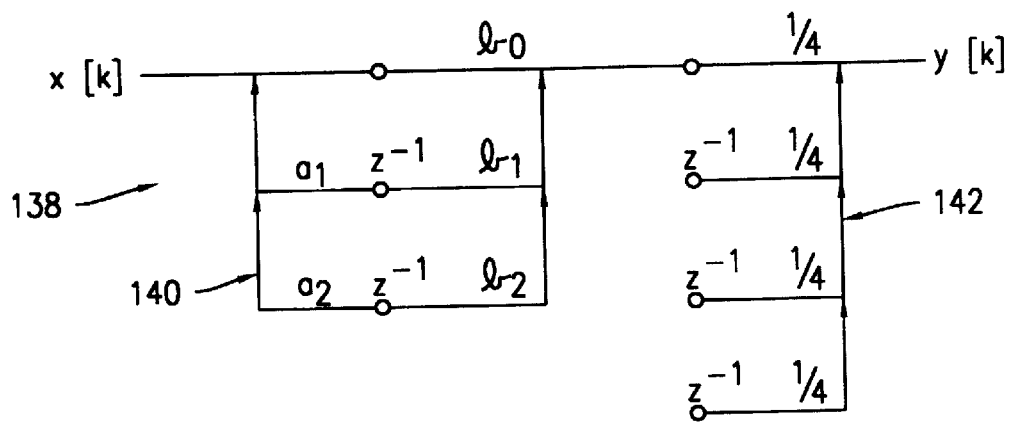
FIG. 5 is a digital filter formula diagram describing a digital filter for programming the microprocessor of FIG. 2 in accordance with a second embodiment of the present invention.

FIG. 5 shows a digital filter 138 in accordance with the present invention which is an equivalent to that described above and shown in FIG. 3, and having two cascaded stages 140, 142. Elements illustrated in FIGS. 5 and 6 which correspond to elements described above with respect to FIGS. 1 to 4 have been designated by corresponding reference numerals increased by 100, 200, etc., respectively. The first stage 140 is a second-order infinite input response (IIR) filter and the second stage 142 is a four sample finite input response (FIR) filter. The output of the first stage 140 is the input of the second stage 142 and the weighting coefficients are as follows:

$$a_1 = \frac{5}{8}, a_2 = -\frac{1}{8}, b_0 = b_2 = \frac{1}{8}, b_1 = \frac{1}{4}$$

Figure 6:
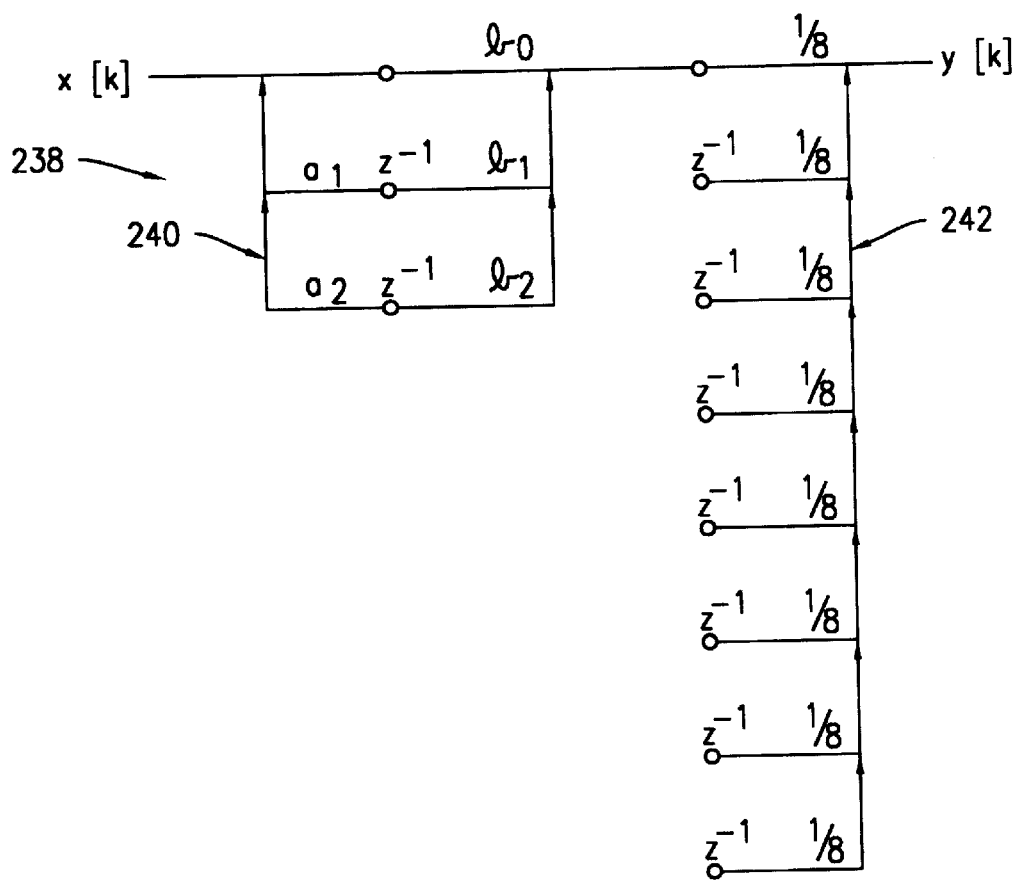
FIG. 6 is a digital filter formula diagram describing a digital filter for programming the microprocessor of FIG. 2 in accordance with a third embodiment of the present invention.

FIG. 6 shows a digital filter 238 in accordance with another embodiment of the present invention which, like the filter of FIG. 5, is a two stage cascaded design. The first stage 240 is a second order IIR filter and the second stage 242 is an eight sample FIR filter. The weighting coefficients are as follows:

$$a_1=1.14, a_2=-0.34, b_0=b_2=0.05, b_1=0.1$$

Figure 7:
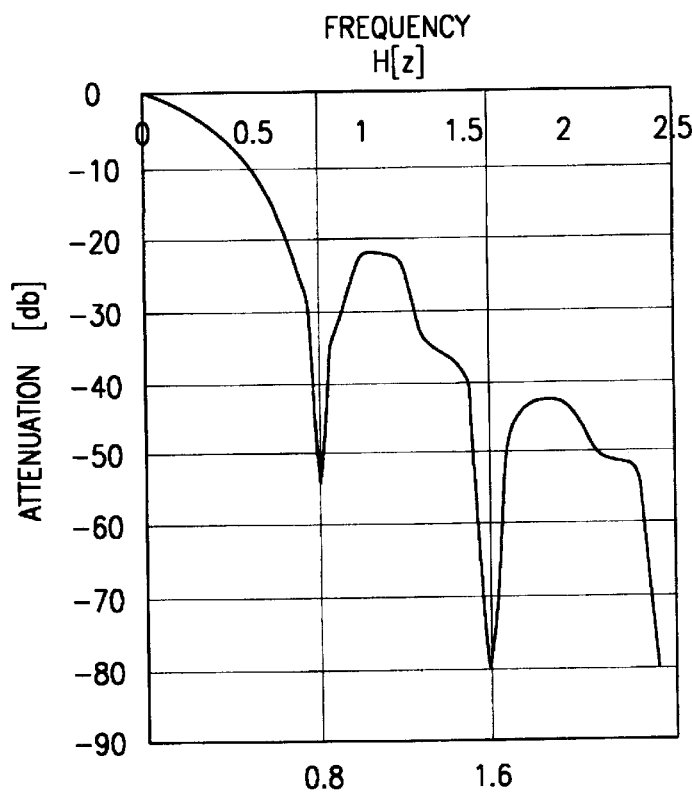
FIG. 7 is a graph of attenuation vs. frequency for a digital filter as described in the diagram of FIG. 6.

The filter 238 of FIG. 6 has two rejection notches proximate to the frequencies of interest, viz., the frequencies of the observed weight oscillations at 0.81 and 1.62 Hz, as shown in FIG. 7.

FIG. 7 graphically shows the expected steady state attenuation in decibels of a load cell signal of a hanging scale filtered by the digital filter 238 depicted in FIG. 6, based upon a computer simulation. The rejection of the signal at frequencies of 0.8 and 1.6 Hz is steep.

Figure 8:
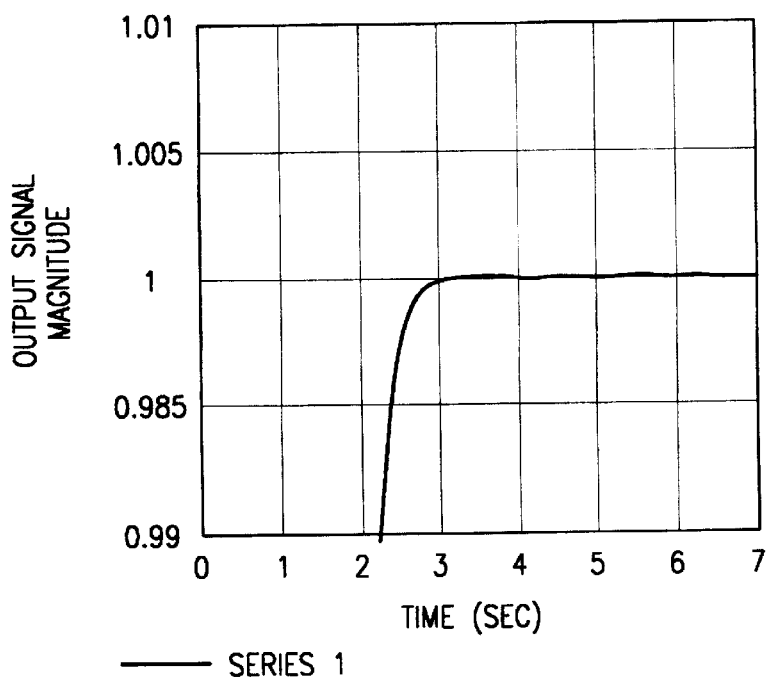
FIG. 8 is a graph of output signal vs. time for a digital filter as described in the diagram of FIG. 6 in response to a computer simulated input signal.

FIG. 8 graphically shows the expected unit step response +10% at 1.6 Hz for the filter depicted in FIG. 6 based upon a computer simulation. The lack of significant signal near 1.6 Hz illustrates the effectiveness of the rejection at 1.6 Hz.

Figure 9:
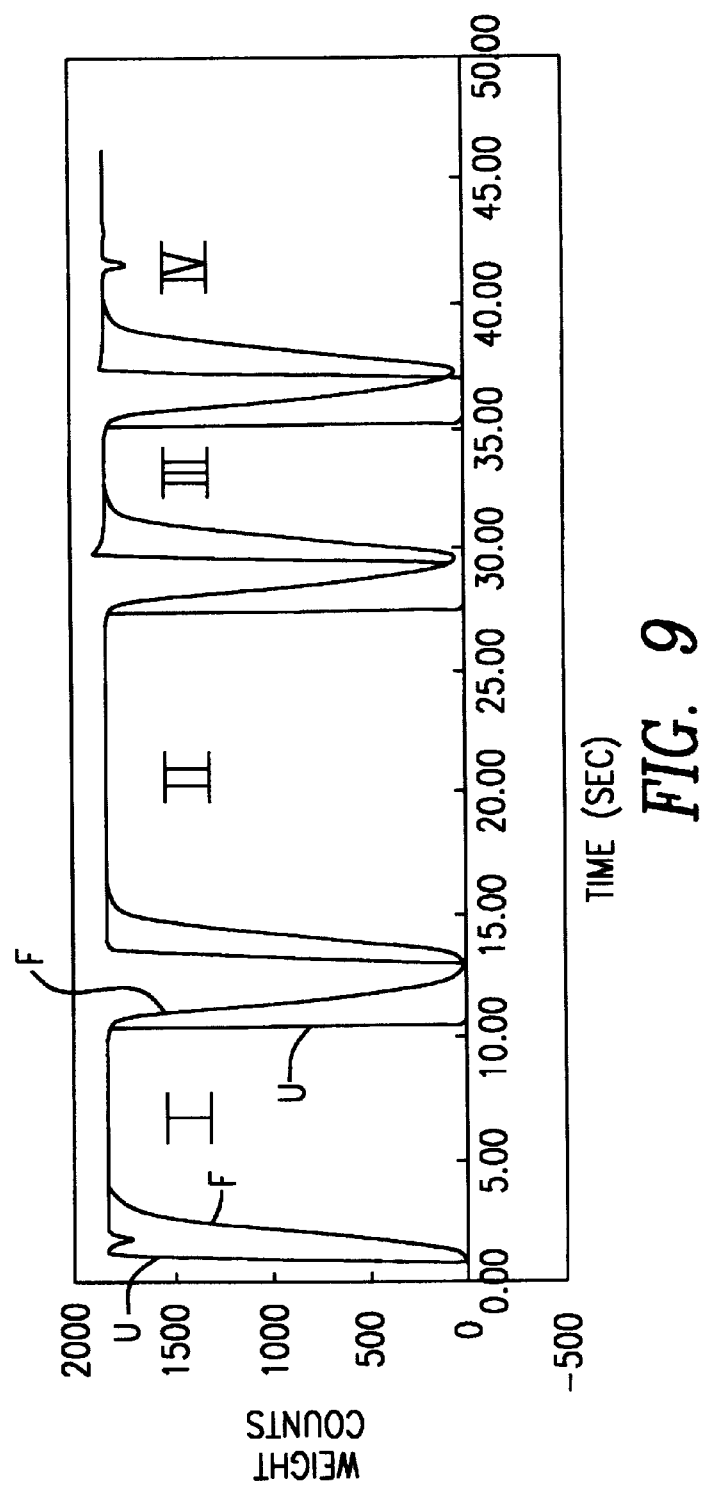
FIG. 9 is a graph of output signal (weight) vs. time for a scale with the raw output signal overlayed by the filtered output signal, over four sequential hanging, removal and rehanging events of a fluid receptacle.

FIG. 9 shows the actual response to a load cell signal, with the unfiltered output signal U shown overlayed by the corresponding filtered output signal F produced by a filter 238 as shown in FIG. 6 during four successive hanging, removal and rehanging events (I–IV). The scale on the Y-axis is in "counts" with 0.5 grams/count. On the leading edge of the first hanging event at about 0 seconds, the weight increases substantially instantaneously from 0 counts to about 1800 counts or 900 grams, as shown by the unfiltered signal U. The filtered signal F shows a more gradual rate of increase. This initial spike in measured weight is followed by a period of oscillation lasting for a duration of about 10 seconds, whereupon the fluid receptacle is removed, causing the unfiltered signal U to spike down to 0, with the filtered signal F decreasing at a somewhat lower rate. The fluid receptacle is rehung at about thirteen (13) seconds, twenty-nine (29) seconds and thirty-seven (37) seconds. As expected, both the unfiltered signal U and the filtered output F approximate the actual weight of the filter receptacle at all times, but there is a persistent oscillation in the unfiltered signal. This oscillation can be seen more readily in FIGS. 10 and 11.

Figure 10:
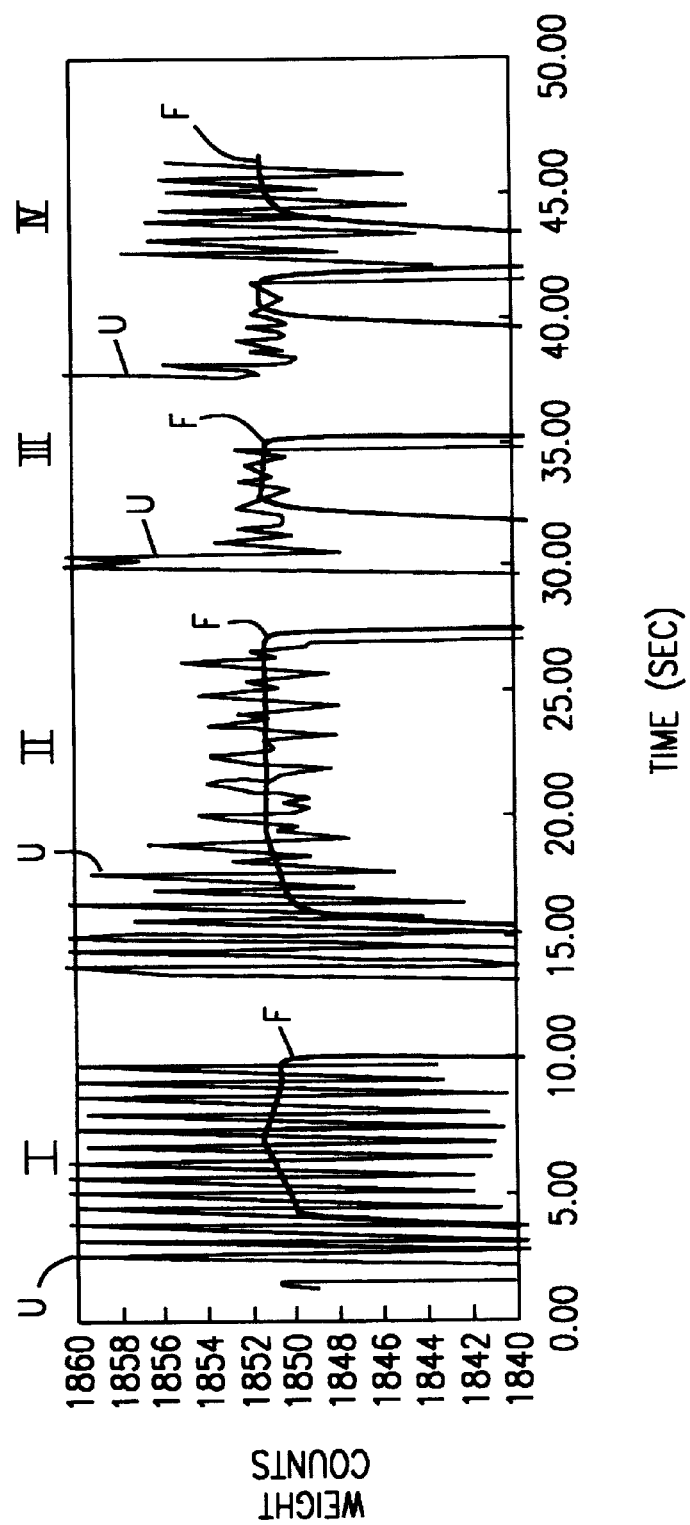
FIG. 10 is a magnification of the graph shown in FIG. 9.

FIG. 10 shows a magnified view of the unfiltered output signal U and overlaid filtered output signal F shown in FIG. 9. The unfiltered output signal can be observed to have a magnitude of oscillation of about +/−5 grams. The filtered signal, in contrast, is substantially flat, i.e., the oscillations are dampened. This is true for each of the hanging/rehanging cycles (I–IV).

Figure 11:
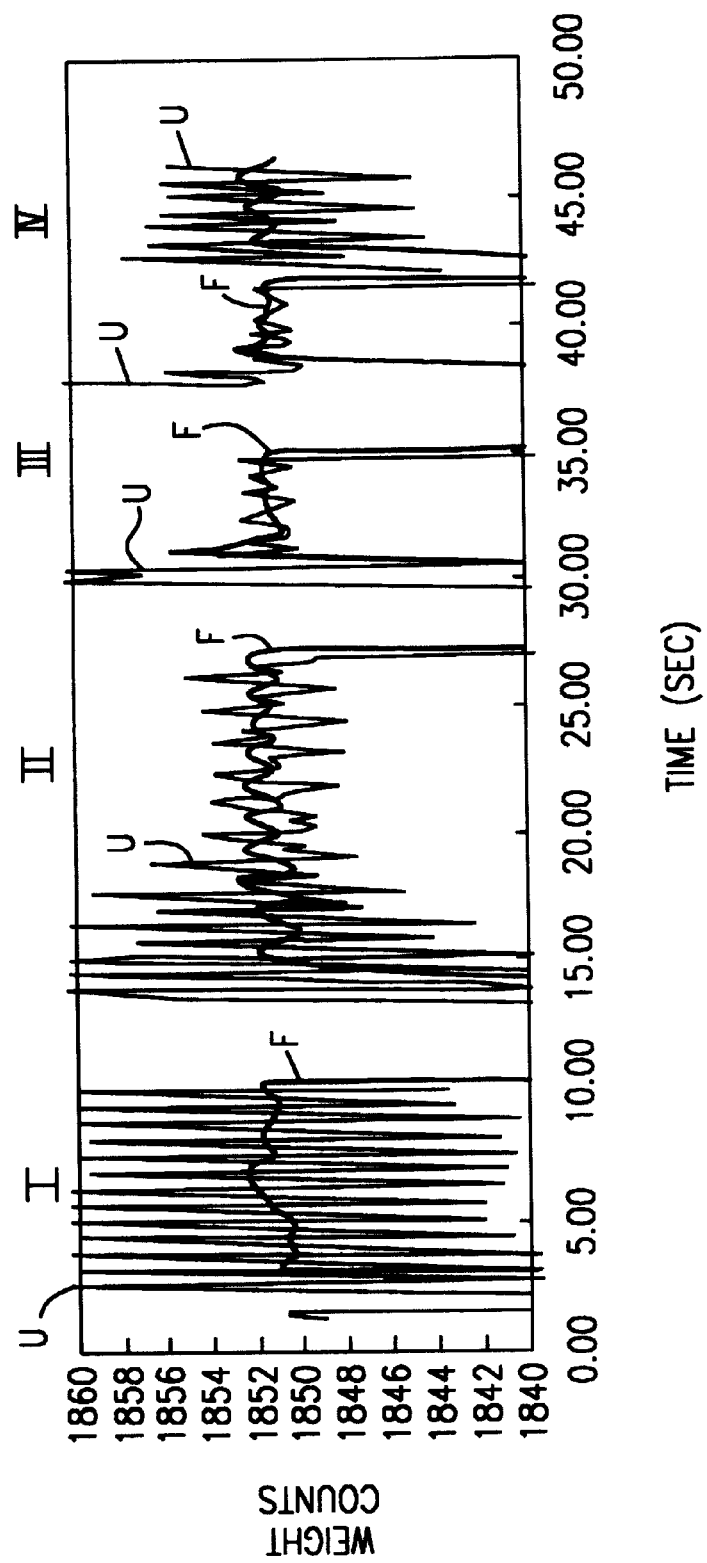
FIG. 11 is a graph like that of FIG. 10 but produced by a filter of the type as described in the diagram shown in FIG. 3.

FIG. 11 is the same type of graph as FIG. 10, but the filtered signal F is processed by the filter 138 shown in FIG. 5. Clearly, the filter 238 depicted in FIG. 6 produces a better dampening effect than the filter 138 of FIG. 5, in that the filtered output signal F shown in FIG. 11 displays slight oscillation during each of the events (I–IV).

Figure 12:
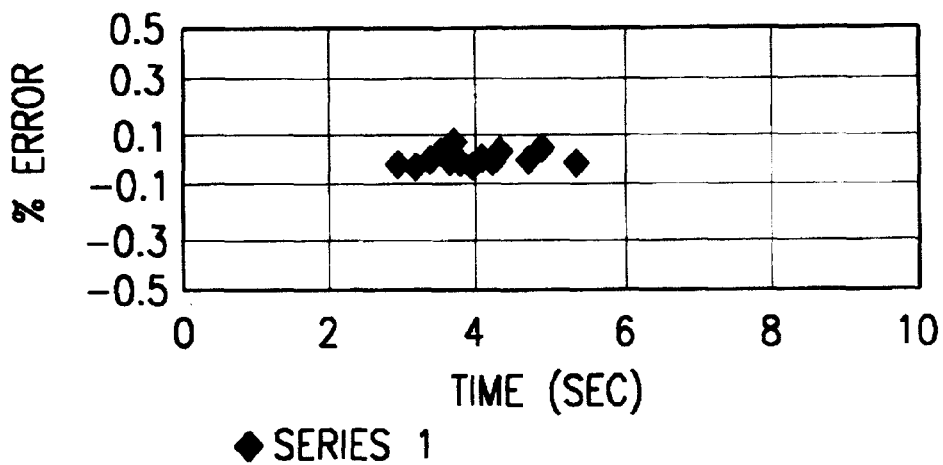
FIG. 12 is a graph of weight measurement error vs. settling time for a bucket-style fluid receptacle.
Figure 13:
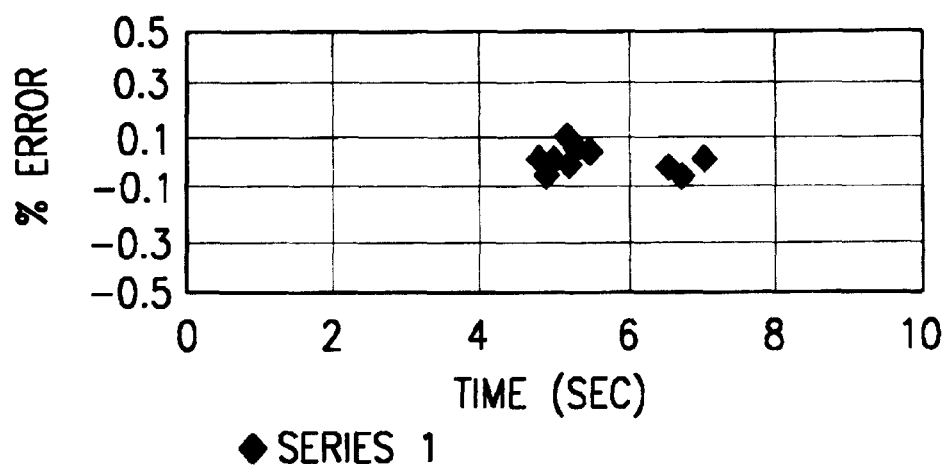
FIG. 13 is a graph of weight measurement error vs. settling time for a bag-style fluid receptacle.

FIGS. 12 and 13 graphically depict the distribution of measurement error and settling time over twenty-five (25) repeated weighing trials for two different fluid receptacles (FIG. 12 relates to a bucket and FIG. 13 to a fluid receptacle bag of the same weight as the bucket of FIG. 12) with a weight output filtered by the filter 238 shown in FIG. 6. As can be appreciated, FIG. 12 shows a measurement error of less than 0.1% between three (3) and five (5) seconds after the receptacle is disturbed, e.g., hung, bumped etc. In FIG. 13, approximately the same degree of precision is realized in about four and a half (4.5) and five and a half (5.5) seconds for a fluid receptacle in the form of a bag.

It should be understood that the embodiments described herein are merely exemplary and that a person skilled in the art may make many variations and modifications without departing from the spirit and scope of the invention as defined in the appended claims. Accordingly, all such variations and modifications are intended to be included within the scope of the invention as defined in the appended claims.

I claim:

1. A scale system for measuring the weight of a fluid receptacle capable of containing a volume of fluid, comprising:

a support for holding the fluid receptacle with a bottom of the fluid receptacle being unconstrained from moving and free to oscillate in periodic motion;

a transducer coupled to said support for converting a force exerted thereon by the fluid receptacle into an electrical signal having noise which is produced in response to the periodic motion of the fluid receptacle and which is in ranges of characteristic frequencies associated with the frequency of the periodic motion of the fluid receptacle;

a digital computer;

an analog-to-digital converter interposed between said transducer and said digital computer; and a digital filter for receiving said electrical signal from said transducer and suppressing noise in said electrical signal at selected frequencies, said digital filter defined by a program which is loadable into said digital computer, said digital filter including an infinite input response filter cascading into a finite input response filter, and said digital filter being selected to have rejection notches at at least one frequency in common with the frequencies of the noise in said electrical signal.

2. The scale system of claim 1, wherein said infinite input response filter is of the second order.

3. The scale system of claim 1, wherein said finite input response filter is an 8-sample filter.

4. The scale system of claim 3, wherein said digital filter has a filter diagram as shown in FIG. 6 and having the weighting coefficients $$a_1=1.14,\ a_2=-0.34,\ b_0=b_2=0.05,\ b_1=0.1,$$

a centering frequency of 1 Hz and a sampling rate of 6.5 samples per second.

5. The scale system of claim 1, wherein said digital filter has a rejection notch at a frequency of approximately 0.8 Hz.

6. The scale system of claim 1, wherein said digital filter has a rejection notch at a frequency of approximately 1.6 Hz.

7. The scale stem of claim 1, wherein said digital filter has two rejection notches, a first at a frequency of approximately 0.8 Hz and a second at a frequency of approximately 1.6 Hz.

8. The scale system of claim 1, wherein said signal is capable of being utilized to calculate at least one of the fluid volume inflow and outflow rates into and out of said receptacle.

9. A method of weighing a suspended object moving in periodic motion causing oscillations in the measured weight with a scale system having a support for holding the object to be weighed and a transducer coupled to said support for converting weighting force exerted thereon by said object into an electrical signal, comprising the steps of:

(a) suspending the object on the support;

(b) setting the object moving in periodic motion;

(c) determining at least one frequency of oscillation in the electrical signal;

(d) selecting a plurality of digital filters and arranging them in cascaded relationship, said plurality of digital filters having at least two rejection notches located in two associated frequency ranges approximating a plurality of said at least one frequency of oscillation in the electrical signal observed in step (c);

(e) programming a computer with instructions implementing said plurality of digital filters;

(f) processing the electrical signal from the transducer with said computer; and (g) suppressing oscillations in the electrical signal at said at least one frequency determined in step (c).

10. The method of claim 9, wherein step (c) is performed by a sampling oscilloscope.

* * * * *